Patented July 19, 1938

2,124,285

UNITED STATES PATENT OFFICE 2,124,285

PROCESS FOR PREPARING MIXED ESTERS FROM PHENOLALDEHYDE RESINS

Hans Theodor Bucherer, Munich, Germany

No Drawing. Application April 6, 1935, Serial No. 15,092. In Germany April 13, 1934

3 Claims. (Cl. 260—4)

It is known that various kinds of phenol-aldehyde resins, i. e., novolak, resol and resite may be converted into new valuable compounds by closing or tying up the hydroxyl groups (see German Patent Number 391,072), and that among the materials suitable for preparing valuable ester-like derivatives of such resins are certain carboxylic acids of high molecular weight (see German Patent Number 456,820). Such carboxylic acids are, for example, stearic acid, palmitic acid, oleic acid, and the acid of colophony, sometimes known as abietic acid.

It has been found that when certain other carboxylic acids of high molecular weight are used, the melt gradually loses its homogeneity under the high temperature which is required for the esterification, and that undesirable gummy substances, which are completely or almost completely insoluble in the usual solvents, are precipitated at an increased rate. This condition applies, especially when it is attempted to use linolic acid. The gummy substances formed by such attempts at esterification are, because of a lack of sufficient solubility, not suitable for immediate use in the manufacture of paints or the like.

Now it has been found that sufficiently soluble ester-like compounds of resins adapted for widely varied purposes, are obtained by esterifying the resins with mixtures of carboxylic acids, the proportions of the individual acids in the mixtures being such that no gummy substances are formed or, if formed, are inappreciable. The ratio in which such mixtures are to be used, must be tried out in every single case. With the use of linolic acid it was found for instance that mixtures of colophony and linolic acid even in the ratio of 3:7, that is, three parts of colophony to seven parts of linolic acid, result in the production of mixed esters the solubility of which still meets the ordinary demands completely. If the proportion of the linolic acid is increased considerably in excess of the ratio indicated, the above mentioned inconveniences occur, apart from a considerable reduction of the melting-point, whilst by keeping the proportions below 3:7 readily soluble esters of sufficiently high melting-point are obtained.

These mixed esters containing linolic acid as a component are particularly valuable because of their surprising behaviour in the drying process. Even without the use of siccative, coats of paints produced with the aid of these mixed esters surpass in drying power all known painting-agents, as after but a few hours a dry film is produced such as may not be expected before a day or two with the use of the usual linseed-oil varnishes.

Another surprising feature of equally great practical importance is the fact that the film which forms during the drying is capable of undergoing alterations under the influence of air and light such as those occurring with the ordinary linseed-oil films and which manifest themselves particularly in a change of their solubility, i. e., the esters forming the film and previously soluble become more or less insoluble in the usual solvents even after a short time.

What I claim is:

1. The herein described process of preparing a rapid-drying mixed ester devoid of gumminess and having sufficient solubility for use as an ingredient of paint, which consists in esterifying a phenolaldehyde resin with a mixture of linolic acid and colophony in the approximate proportions of seven parts of linolic acid to three parts of colophony.

2. The herein described process of producing a rapid-drying mixed ester substantially devoid of gumminess and sufficiently soluble for use as an ingredient of paint, which process consists in esterifying a phenolaldehyde resin with a mixture of carboxylic acids, said mixture containing linolic acid and a second acid of high molecular weight selected from the class consisting of colophony, stearic acid, palmitic acid and oleic acid, the proportion of the linolic acid to said second acid being approximately 7 to 3.

3. A compound consisting of the product of esterification of a phenol-aldehyde resin with a mixture of linolic acid and a second carboxylic acid selected from the class consisting of colophony, stearic acid, palmitic acid and oleic acid, the proportion of the linolic acid to said second acid being approximately 7 to 3.

HANS THEODOR BUCHERER.